UNITED STATES PATENT OFFICE.

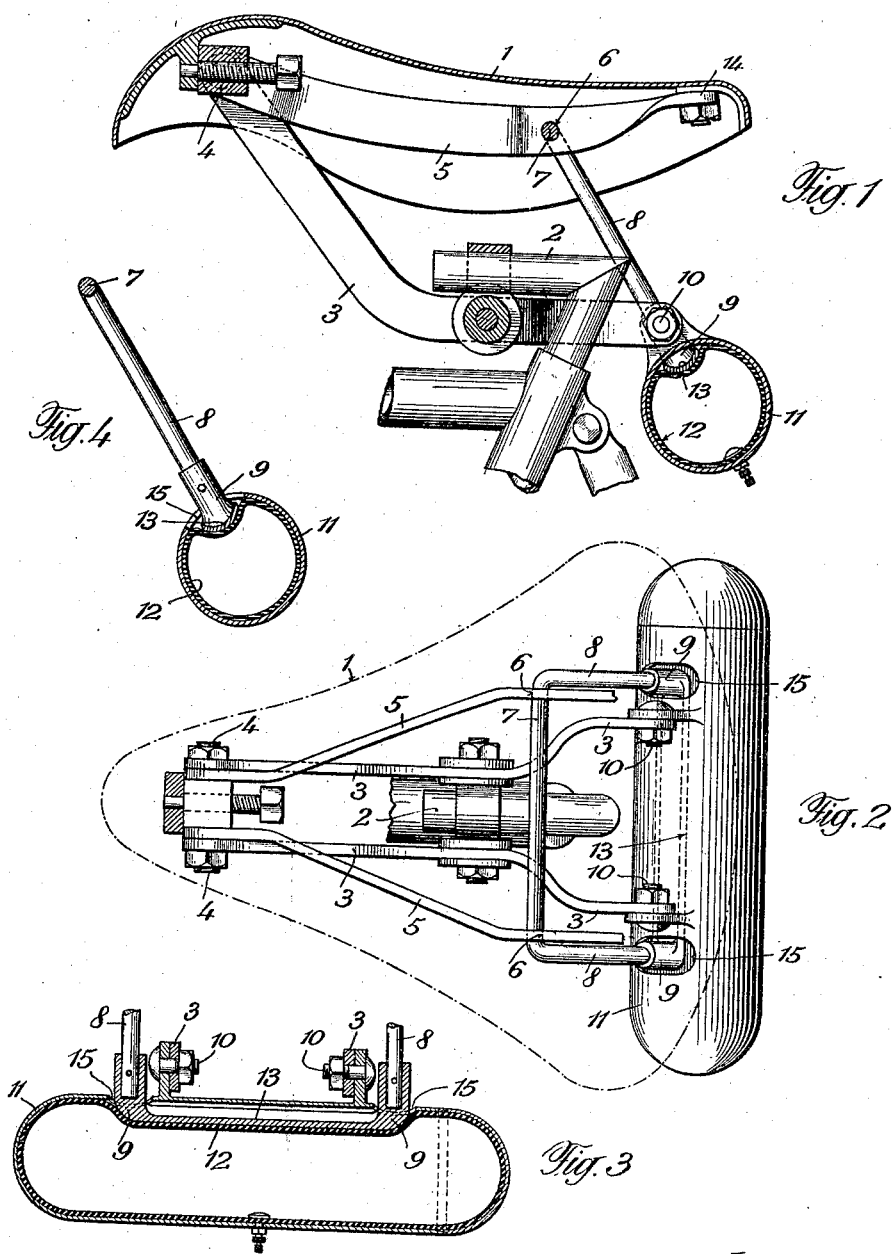

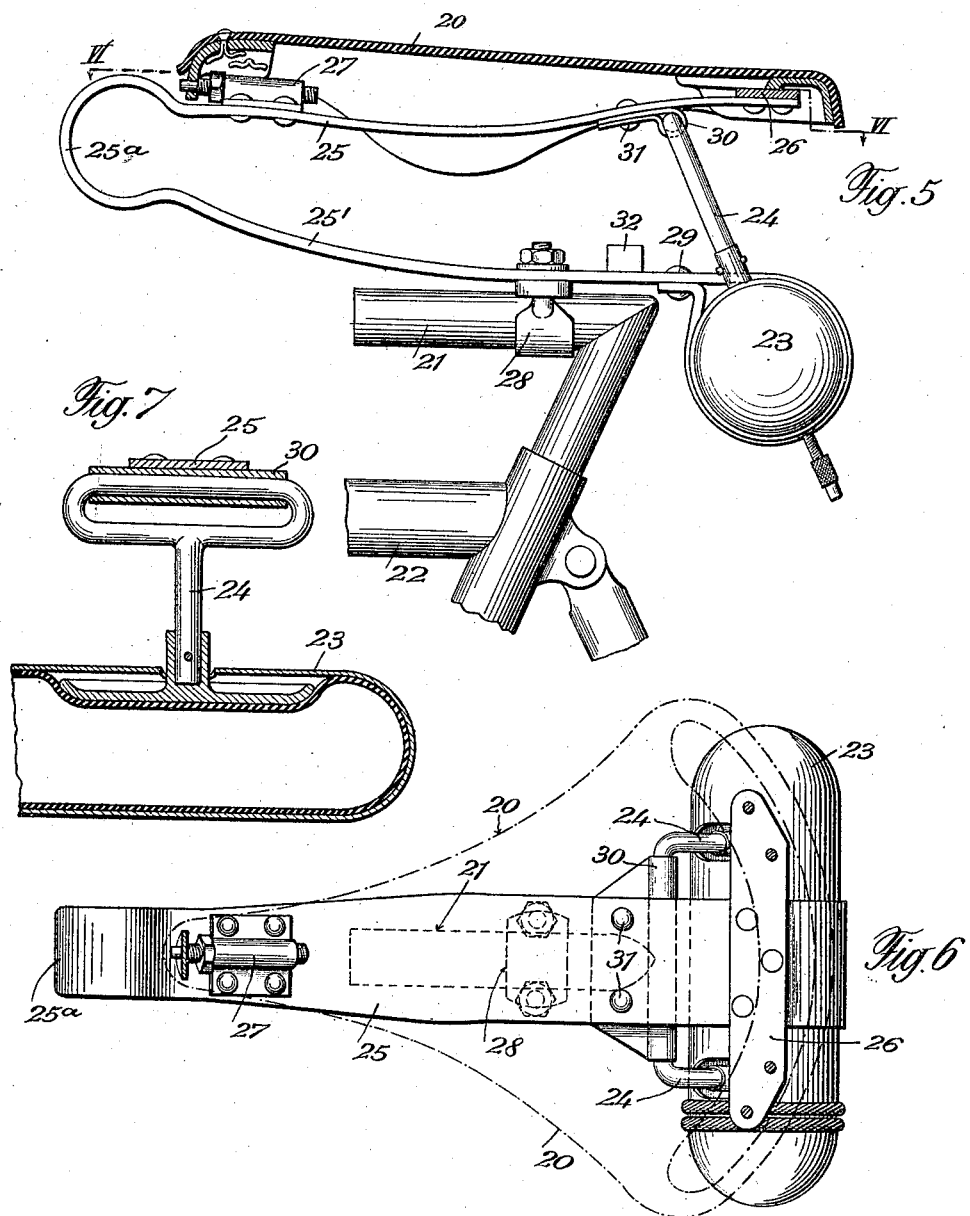

JOSEF HOFMANN, OF BAUMAROCHE, SWITZERLAND.

PNEUMATIC SPRING.

1,300,727.　　　　　　　Specification of Letters Patent.　　Patented Apr. 15, 1919.

Application filed October 11, 1918.　Serail No. 257,763.

*To all whom it may concern:*

Be it known that I, JOSEF HOFMANN, a citizen of Poland, Austria, and resident of Baumaroche, Switzerland, have invented certain new and useful Improvements in Pneumatic Springs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

For the purpose of obtaining good resiliency in pneumatic springs subjected not only to vertical but also to oblique shocks or pressures, such springs should be adapted to absorb shocks in a resilient manner without impairing the stability of the spring-supported parts.

It has been found, for instance, that one-sided pressures exerted by the driver upon the saddle of a bicycle should be counteracted by a resistance adapted to absorb on the one hand such pressures in a resilient manner, and prevent, on the other hand, any impairment of the stability of the saddle.

As the resiliency of pneumatic springs is as a rule very great, the stability of the saddle of bicycles supported by pneumatic springs is generally not sufficiently secured. This is the case, for instance, with regard to saddles supported by a pneumatic spring comprising an air cushion arranged in the direction of the axis of the saddle beneath the latter and having a relatively small volume and further comprising a piston supported in the axial direction of the saddle and coöperating with said air cushion. By such an arrangement the saddle is only supported at one point, so that it has a tendency to tilt when the swinging movements of the driver's body are transmitted to it. On the other hand, the provision of two symmetrically arranged air cushions providing two supports for the saddle is also not satisfactory, as it is very difficult to fill two air cushions equally with air, so that the resiliency of the two supporting points is not an equal one. In such an arrangement any loss of air in one of the two air cushions reduces moreover the resiliency of said cushion, while the provision of any means connecting the interior of the two air cushions gives rise to air leakage.

Other known pneumatic suspensions comprising an air vessel and a piston working therein and in which the piston rod is connected by means of a hinged lever arm to said vessel, are also only adapted to take up shocks acting in a vertical plane situated at right angles to the axis of the hinge. Any lateral shocks cause a jamming of certain parts of the hinge, as the latter acts in the lateral direction as a rigid body. Such a jamming prevents a proper working of the pneumatic spring and causes also a wearing out of the hinge.

Now this invention has for its object to provide a pneumatic suspension for vehicles and the like, in which the disadvantages hereinbefore mentioned are avoided.

According to the present invention this is obtained by arranging an elongated air cushion crosswise to the longitudinal axis of the body or element to be spring supported, for instance the saddle of a bicycle, and by providing on the air cushion preferably two supports for said body arranged symmetrically with regard to the longitudinal axis of the body.

A further object of this invention is to provide a pneumatic suspension adapted to take up lateral shocks, in which no hinge has to be provided between the lever arm and the air vessel or cushion, a spring joint being provided between said vessel and a point acting as a support for means resting on the air cushion.

To the attainment of other new and useful objects, as will appear, the invention consists also in the features of novelty in the construction, combination and arrangement of the several parts hereinafter more fully described and claimed, and shown in the accompanying drawings which illustrate several exemplifications of the invention.

In said drawings—

Figure 1 is a vertical cross-section of a saddle of a bicycle provided with the novel pneumatic suspension.

Fig. 2 is a top plan view corresponding to Fig. 1, the saddle proper being removed.

Fig. 3 is a longitudinal vertical cross-section through the air cushion and the supporting member for the saddle.

Fig. 4 is a cross-section through a detail.

Fig. 5 is a vertical cross-section through the saddle of a bicycle, illustrating a second embodiment of the invention.

Fig. 6 is a cross-section on the line VI—VI of Fig. 5, and

Fig. 7 shows a modification of a detail of the second embodiment.

Referring to Figs. 1 to 4, 1 denotes a load supporting means, here shown as the saddle of a bicycle. This saddle is secured to the saddle post 2 forming a part of the bicycle frame by means of a lower supporting member consisting of two flat metal rods 3 and a pin 4 carried by said rods 3. On the pin 4 is pivotally mounted an upper supporting member, consisting of two flat metal rods 5 rigidly connected to the saddle at 14. The middle shank 7 of a stirrup-like member 7—8 passes through holes 6 of the rods 5, acting as bearings for said member 7—8. The rods 8 constituting the end shanks of the stirrup 7—8, are for supporting the saddle 1, and rest on an air cushion 12. The rods 8 engage supporting means of the air cushion arranged symmetrically with regard to the longitudinal axis of the saddle. Said rods are rigidly connected together by means of a member 13 provided with sleeve-like ends 9 and acting as a piston for the air cushion 12. The air cushion 12 is inclosed in a cylindrical metallic casing 11 provided with apertures 15 through which pass the sleeve-like ends 9 of the piston member 13. The casing 11 is rigidly connected to the rods 3 by means of bolts 10.

The operation of the described device is as follows:

The load carried by the saddle 1 is distributed in an equal manner over the rods 8 which engage the supporting member 13 resting on the air cushion 12. Each of said rods 8 transmits the pressure produced by the lateral oscillations of the load to the air cushion 12. Owing to the elongated, and in the embodiment shown, also cylindrical shape of the air cushion 12, the volume of the latter is considerably greater and consequently the recoil of the air cushion much softer than that of an air cushion having for instance a spherical shape and a diameter corresponding to the diameter of the cross-section of the air cushion 12. Thus, in the embodiment shown, a perfect resilient support of the load is attained. The elongated cylindrical shape of the cushion, longer and wider than the plunger member 13, permits this member to rest in a depression in the cushion that holds the plunger member against lateral and longitudinal displacement of the cushion, somewhat like the socket of a universal joint, and thus permits the stirrup to have universal movement while dispensing with all guides for the rods 8.

By inclining the stirrup member at an obtuse angle to the saddle as shown, the amplitude of movement of the plunger member 13 is much less than that of the saddle, which would not be the case if the rods 8 were disposed vertically.

By providing an elongated air cushion of the kind shown, the best use of the space available on a bicycle for placing an air cushion is made, as a long cushion does not take up in the vertical direction more space than a spherical one, while the space in the transverse direction, which is always disposable, is filled out in a much better manner.

The rigid connection 13 provided between the supporting ends 9 for the rods 8, and which can only be provided in consequence of the elongated shape of the air vessel, acts also as a support for the load and provides for a greater supporting surface for the load. This prevents to a greater degree than the provision of two separate supporting points, any tilting over of the saddle when the oscillations of the driver's body are transmitted to it. The described pneumatic suspension is also of simple design and cheap to manufacture.

Referring now to Figs. 5 and 6: 20 denotes a load supporting element, also shown as the saddle of a bicycle, carried by a support 21 fixed to the frame 22. 23 denotes the elongated air vessel or air cushion arranged crosswise to the longitudinal axis of the saddle 20. The air cushion 23 acts as a support for two rods 24 belonging to a stirrup-like member and engaging supporting means of the kind shown in Figs. 1–4 resting on the air cushion.

The saddle 20 is connected to its support 2 by means of a plate spring 25, 25'; the connection between the saddle 20 and the upper supporting portion 25 of the spring is effected at one end by means of a transverse member 26 and at the other end by means of a tension member 27. The plate spring comprises an arc-shaped portion $25^a$ connecting the two parts 25 and 25' and projecting beneath the saddle beyond its pointed end. Said arc-shaped portion $25^a$ acts as a resilient joint or link of the system of levers formed by said parts 25, 25'. The lower supporting portion 25' of the plate spring is rigidly connected to the saddle support 21 by means of a clip connection 28. One end of the part 25' surrounds the outer circumference of the air vessel or cushion 23 and is secured by means of rivets 29 to said part 25', so that the air cushion 23 is carried in a resilient manner by the part 25'. A sheet-iron strap 30 is bent in a sleeve-like manner around the middle shank of the stirrup-like member of which the rods 24 form the end shanks. The strap 30 is fixed to the spring part 25 by means of rivets 31, so that the rods 24 are carried by the part 25 of the system of levers. 32 denotes an india-rubber cushion or bumper secured to the lower member 25' at a point between the clip 28 and the rear end of the member.

The saddle illustrated in Figs. 5 and 6 is supported in a resilient manner owing to the fact that the resilient link 25ª constitutes, together with the lever arm acting as a support for the rods 24 and the part carrying the saddle, a spring. This is the case even when the load shifts forward toward the pointed end of the saddle, as the load is then taken up more and more by the spring.

The air vessel 23 is adapted to act as a resilient support even when a very great pressure is exerted on the saddle, it being mounted in a resilient manner owing to the connection of the plate spring 25, 25' to the saddle support 21 by means of the clip 28. As a result of the resilient arrangement of the air cushion 23, a too great compression of the air in said cushion is prevented when a great pressure acts upon the saddle, the air cushion yielding as a whole, so that the supporting means resting on the air cushion and engaged by the rods 24 do not plunge so deep into the cushion as would be the case were the air cushion mounted in a rigid manner.

The arrangement illustrated in Fig. 7 comprises only one rod 24, and therefore also only one support for the saddle on the air cushion.

Although I have shown the new pneumatic suspension only as applied to saddles of bicycles, I wish it to be understood that the improved suspension can also be used for the resilient suspension of any parts of vehicles or the like.

I claim—

1. A pneumatic suspension for vehicles and the like, comprising an elongated air cushion arranged crosswise to the longitudinal axis of the element of the vehicle to be spring supported, a frame carrying said element and air cushion, supporting means provided on the air cushion and free to have universal movement, and means connected at one end to the element to be spring supported and engaging at the other end said supporting means on the cushion.

2. A pneumatic suspension for vehicles and the like, comprising an elongated air cushion arranged crosswise to the longitudinal axis of the element of the vehicle to be spring supported, a frame carrying said element and air cushion, supporting means provided on the air cushion, said means symmetrically arranged with regard to the longitudinal axis of the element to be spring supported and configured to form a recess in said cushion, and means connected at one end to said element and engaging at the other end said supporting means.

3. A pneumatic suspension for vehicles and the like, comprising an elongated air cushion arranged crosswise to the longitudinal axis of the element of the vehicle to be spring supported, a frame carrying said element and air cushion, a convex member having universal movement resting on the latter and having its ends symmetrically arranged with regard to the longitudinal axis of the body to be spring supported and a stirrup-like member carried by said element, the end shanks of said stirrup-like member engaging the ends of the member resting on the air cushion.

4. A pneumatic suspension for vehicles and the like, comprising an air cushion, means resting on the air cushion, a member supported by said means, a lever arm carrying the element to be spring supported and said member, an arm carrying the air cushion and secured to the frame of the vehicle and a resilient portion connecting said arms.

5. A pneumatic suspension for vehicles and the like, comprising an air cushion of substantially greater length than width arranged crosswise to the longitudinal axis of the element of the vehicle to be spring supported, means resting on the air cushion, a member supported by said means, a lever arm carrying the element to be spring supported and said member, an arm carrying the air cushion and secured to the frame of the vehicle and a resilient portion connecting said arms.

6. A pneumatic suspension for vehicles and the like, comprising an elongated air cushion arranged crosswise to the longitudinal axis of the element of the vehicle to be spring supported, means resting on the air cushion, a member supported by said means, a resilient lever arm carrying the element to be spring supported and said member, a resilient arm carrying the air cushion and secured to the frame of the vehicle and a resilient portion connecting said resilient arms, which act together with said portion as a spring.

7. A pneumatic suspension for vehicles and the like, comprising an elongated air cushion arranged crosswise to the longitudinal axis of the element to be spring supported, means resting on the air cushion, a member supported by said means, a plate-like resilient lever arm carrying the element to be spring supported and said member, a second plate-like resilient arm carrying the air cushion and secured to the frame of the vehicle and a resilient portion connecting the two resilient arms, which act together with said portion as a plate spring.

8. In a pneumatic suspension, a continuous leaf spring comprising an upper supporting member connected to a lower supporting member by a connecting bend, a pneumatic cushion supported at the end of one of said members, a support swiveled to the other member and engaging said cushion, and fastening means for the first mentioned member between said cushion support and said bend whereby said cushion is yieldingly supported.

9. In a pneumatic suspension, an upper supporting member and lower supporting member yieldingly connected together at one end, an elongated air cushion carried at the end of one of said members, and a piston member pivotally connected to the other member and acting on the side of the elongated air cushion and free to have universal movement on said cushion.

10. In a pneumatic suspension, an upper supporting member and a lower supporting member of flat spring metal connected together at one end by an arc-shaped portion all in a single piece, a cylindrical air cushion receptacle supported in a loop formed by one of said members and transversely of said member, an inflatable member in said cylinder, a yoke pivoted to the other member, a piston arranged longitudinally of said cylinder and connecting the ends of said yoke and free to move universally.

11. In a pneumatic suspension for vehicles, an inflatable air cushion having a major diameter substantially greater than its minor diameter, a casing containing said cushion, an elongated member included between said cushion and casing, said member being of less area than the longitudinal section of said cushion and shorter than the cushion, whereby the member will be sustained and automatically held in a depression in said cushion to permit universal movement without displacement under all conditions of operation, and means connected to said member and the element to be supported.

12. In a pneumatic suspension for vehicles, an inflatable air cushion having a longitudinal diameter substantially greater than its cross-sectional diameter, a casing containing said cushion, an elongated member included between said cushion and casing, said member being of less area than the longitudinal section of said cushion and shorter than the cushion, whereby the member will be sustained and automatically held in a depression in said cushion to permit universal movement without displacement, and inclined means rigidly fixed to said member and yieldingly connected to the element to be supported.

In testimony that I claim the foregoing as my invention, I have signed my name hereto.

JOSEF HOFMANN.